United States Patent [19]

Anthony

[11] 4,078,967
[45] Mar. 14, 1978

[54] HOLDDOWN DEVICE FOR NUCLEAR FUEL ASSEMBLY

[75] Inventor: Andrew James Anthony, Tariffville, Conn.

[73] Assignee: Combustion Engineering, Inc., Windsor, Conn.

[21] Appl. No.: 708,514

[22] Filed: Jul. 26, 1976

[51] Int. Cl.² ............................................. G21C 3/30
[52] U.S. Cl. ........................................ 176/78; 176/76
[58] Field of Search ........................... 176/50, 54–56, 176/61, 76, 78

[56] References Cited

U.S. PATENT DOCUMENTS

| | | | |
|---|---|---|---|
| 3,431,170 | 3/1969 | Lass et al. | 176/78 |
| 3,770,583 | 11/1973 | Klumb et al. | 176/76 |
| 3,775,249 | 11/1973 | Clapham | 176/78 |
| 3,791,466 | 2/1974 | Patterson et al. | 176/78 |
| 3,814,667 | 6/1974 | Klumb et al. | 176/78 X |
| 3,846,234 | 11/1974 | Class et al. | 176/78 |

*Primary Examiner*—Peter A. Nelson
*Attorney, Agent, or Firm*—Joseph H. Born

[57] ABSTRACT

An apparatus for preventing "floating" of nuclear-reactor fuel assemblies due to hydraulic forces is disclosed. The apparatus uses a holddown column made of the same material as the core barrel. The column is positioned in a center guide-tube location in the fuel assembly in such a manner as to enable it either to slide within the center guide tube or, if the center guide tube is replaced by the column, to slide through openings in the spacer grids. The lower end of the holddown column engages the lower end fitting of the fuel assembly, and the upper end of the column engages a flow plate to which holddown force is applied. As a consequence of this arrangement, holddown force is transmitted from the flow plate through the holddown column to the lower end fitting. Movement of the fuel assembly is thereby prevented without a compression load being applied to the fuel-assembly structure. In addition, variations due to thermal expansion in the distance between the lower core plate and the upper core plate are largely made up for by corresponding variations in the holddown column because the holddown column and the core barrel can be made of the same material.

8 Claims, 3 Drawing Figures

HOLDDOWN DEVICE FOR NUCLEAR FUEL ASSEMBLY

BACKGROUND OF THE INVENTION

Fuel assemblies in nuclear reactors are subject to hydraulic forces that may exceed the weight of the fuel assemblies and therefore cause the fuel assemblies to "float" in the reactor if they are not properly secured. If a fuel assembly were to float upward just enough to cause it to be disengaged from the seating surface of the lower core plate on which it sits, it would in essence be laterally unrestrained, and this condition could subject the fuel assembly to severe fretting. Because of this possibility, fuel-assembly designs have included elements whose purpose is to prevent floating.

One method of preventing floating is to mount springs on the tops of the fuel assemblies. The spring are compressed between an upper plate and the remainder of the fuel assembly, thereby providing sufficient holddown force to prevent the fuel assembly from being disengaged from seating surfaces on the lower core plate. While this method has been effective in the prevention of floating, designs employing it have characteristics that make it desirable to have the alternative of the present specification available.

Among such characteristics is that the springs apply a compressive force to the structure of the fuel assembly. This compressive force makes it necessary to build assemblies that are strong enough to withstand the expected compressive forces, and the increased strength requirements dictate that more material be used in the structural (non-fuel) parts of the assembly. This increased amount of material results in increased drag, thereby increasing size and force requirements on the springs. Accordingly, the returns to be derived from increasing the size of the springs diminish as the holddown force required increases. Also, higher compressive loads on the fuel-assembly structure increase the tendency of the fuel assembly to bow due to thermal- /and irradiation-induced creep of the structural material. This bowing, which can cause refueling difficulties and higher fuel temperatures, is particularly likely to occur when the structural parts of the assembly are made of Zircaloy, which exhibits a fairly strong tendency for growth and creep.

The spring problem is further complicated by the fact that length variations in the various components of the nuclear reactor system occur during reactor operation, and this makes it necessary that the springs be designed to apply the rated force even when such length variations allow the springs to extend to a relatively expanded condition. But if the springs apply the rated force when they are in a relatively expanded condition, then they apply an even greater force when length variations cause them to contract, and this again requires that the fuel assembly include a greater quantity of structural material. Accordingly, if length variations are to be expected, then either the fuel assemblies must be designed to bear a greater compressive load, or the springs must be made long enough so that length variations do not contribute greatly to the Hooke's-Law force. Neither of these requirements is welcomed by the fuel-assembly manufacturer.

Since current fuel-assembly designs are complicated by length variations and are quite adversely affected by increased flow rates, it has been suggested that improved results could be obtained by holding the fuel assemblies down from their lower, or upstream, end, using the lower core plate as a source of holddown force; this scheme would eliminate the compressive force on the fuel assembly. While this idea may ultimately prove workable, it would not be undesirable to have an alternate design that avoids two of the design requirements dictated by this scheme. These are that a reliable latching mechanism be provided and that the core barrel be designed to have enough strength to withstand the additional load applied to it by the lower core plate.

SUMMARY OF THE INVENTION

Accordingly, the present invention provides a mechanism for applying holddown force at the upstream end of the fuel assembly without changing the loading of the core barrel and without requiring a latching mechanism. In addition, it reduces the effect of length variations on spring designs. According to the present invention, holddown force is applied not to the fuel-assembly structure but to a holddown column that either fits within a center guide-tube or takes the place of the center guide-tube and fits through openings in the spacer grids. The holddown column is made of the same material as the core barrel. As a result, the thermal expansion of the core barrel, which is the source of much of the variation that the springs must accommodate, is approximately matched by the thermal expansion of the holddown column. Also, since the holddown column can be made of stainless steel, rather than the Zircaloy typically used in the fuel-assembly structure, the effect of irradiation growth is minimized.

The remainder of the fuel-assembly structure, made of a material chosen for its low-neutron-absorption characteristics, varies in length by a different amount from that by which the core barrel changes. However, since the holddown column only engages the fuel-assembly structure at its lower end fitting, the expansion and contraction of the fuel-assembly structure does not affect the operation of the holddown mechanism.

BRIEF DESCRIPTION OF THE DRAWINGS

These and further features and advantages of the invention become evident in the description of the embodiment shown in the attached drawings, in which.

DETAILED DESCRIPTION OF THE PREFERRED EMBODIMENT

Figure 1:
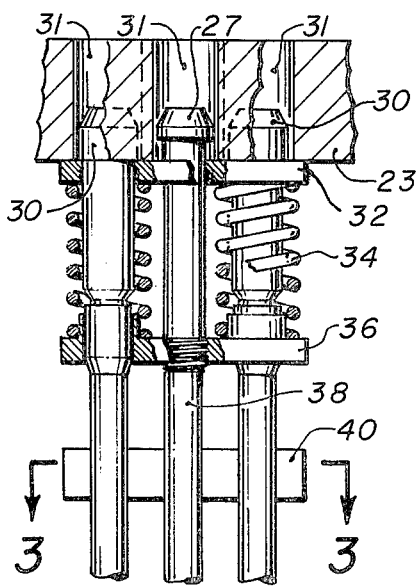
FIG. 1 is a simplified sectional view of a pressure vessel showing the position of a fuel assembly.
Figure 1:
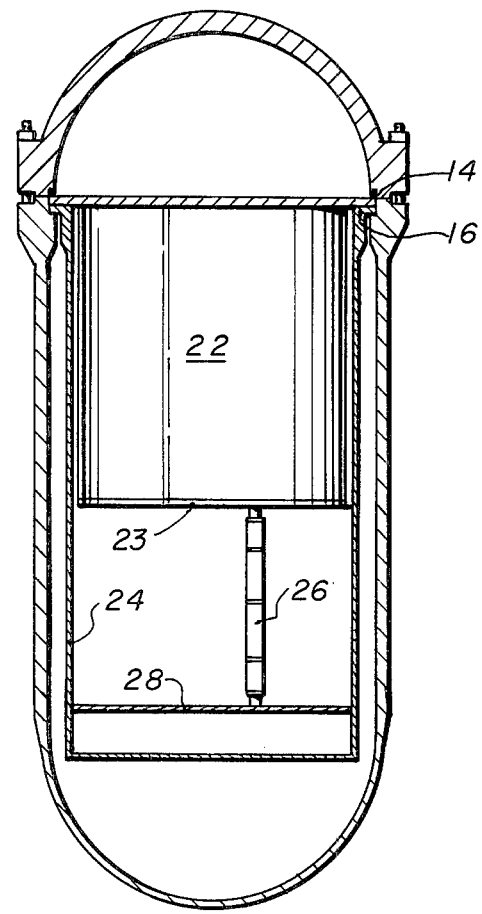

FIG. 1 shows the typical placement of the fuel assembly within a nuclear reactor. Fuel assembly 26 is held between lower core plate 28 and upper core plate 23, upper core plate 23 being part of upper guide structure 22. Lower core plate 28 is held in place by a cylindrical core barrel 24, which in turn is held in place by annular core-barrel flange 16. Upper guide structure 22 is prevented from moving with respect to core barrel 24 by means of upper-guide-structure flange 14. In the reactor configuration in which the present invention finds its principle application, upper guide structure 22 and core barrel 24 are made of the same material, typically stainless steel. It can therefore be appreciated that thermal variations in the length of that part of core barrel 24 between core-barrel flange 16 and the level of upper core plate 23 are matched by corresponding variations in upper guide structure 22. Consequently, variations in the distance between upper core plate 23 and lower core plate 28 are caused primarily by thermal expansion and contraction of that part of core barrel 24 between lower core plate 28 and the level of upper core plate 23. Variations in fuel assembly 26, whose structural parts are typically made of a material, such as Zircaloy, characterized by low neutron absorption, usually do not match the variations in distance between upper core plate 23 and lower core plate 28. These variations, as well as manufacturing tolerances, are absorbed by springs, not shown in FIG. 1, that maintain sufficient holddown force on the assembly to prevent it from floating off its seating surface on lower core plate 28.

Figure 2:
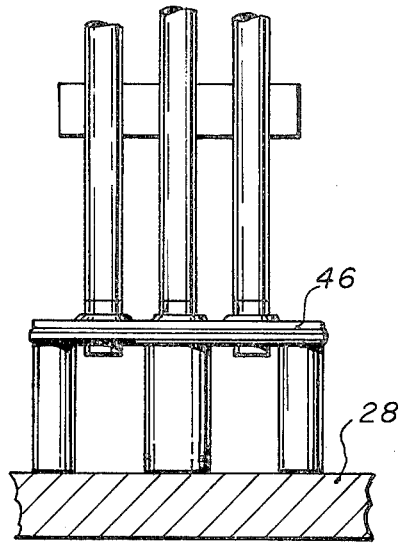
FIG. 2 is a side view, partially in cross section, of the fuel assembly.

FIG. 2 represents a fuel assembly employing the holddown device of the present invention. When upper guide structure 22 is lowered into the reactor after refueling, upper core plate 23, which is part of upper guide structure 22, sits on the upper end of the fuel assembly and forms a stationary member. Holes 31 located in upper guide structure 22 register with upper-end-fitting posts 27 and 30 on the fuel assemblies. As upper guide structure 22 is lowered, upper core plate 23 engages holddown plate 32, applying force to and thereby compressing holddown springs 34. Holddown plate 32 is slip fit on upper-end-fitting posts 27 and 30, thereby allowing it to move with respect to the rest of the fuel assembly. Flow plate 36, which forms a seating surface for the springs 34, is also slip fit on the outer upper-end-fitting posts 30, but it is rigidly attached to center upper-end-fitting post 27 and holddown column 38. Accordingly, when upper core plate 23 engages holddown plate 32, holddown springs 34 are compressed, and the resulting force is applied to flow plate 36. Neither holddown plate 32 nor flow plate 36 applies any force to upper-end-fitting posts 30, but flow plate 36 transmits the force from holddown springs 34 to holddown column 38. Thus, upper core plate 23, holddown plate 32, springs 34, and flow plate 36 together comprise means for applying an upstream force to holddown column 38. Holddown column 38 is slip fit in spacer grids 40, which are the parts of the fuel assembly that keep the fuel rods in lateral position. In other words, the force-transmitting member, holddown column 38, is arranged to move freely in the upstream and downstream directions with respect to all of the fuel assembly except for lower end fitting 46 and those parts of the fuel assembly—flow plate 36, spring 34, and holddown plate 32—that constitute parts of the means for applying a holddown force. The fact that the holddown column is slip fit allows it to be compressed without compression of the fuel-assembly structure. The force transmitted to holddown column 38 is applied to lower end fitting 46, lower end fitting 46 is pressed against lower core plate 28, and fuel assembly 28 is thereby held in position. A typical fuel assembly may, in addition to corner guide tubes 42, have a guide tube positioned in the center for the purpose of containing in-core instrumentation and the like. The holddown column of the present specification, being hollow, could substitute for the center guide tube, as is shown in FIG. 2, or it could be placed inside the center guide tube. In either case, interference with pre-existing designs would be minor.

It is to be noted that the holddown load is borne by upper core plate 23, while lower core plate 28 bears that part of the spring force that is not counteracted by flow forces. This results in a tension load on the core barrel of the type experienced with traditional designs, so the core barrel need not be redesigned to bear the compressive load that could be experienced if the holddown forces were applied by the lower core plate. This, of course, is a particular advantage in those applications in which fuel assemblies are to be used in already-built or already-designed reactors.

During operation of the reactor, temperature increases cause expansion of core barrel 24, and an increased distance results between upper core plate 23 and lower core plate 28. In general, this increase is not matched by variations in the length of guide tubes 42, which are typically made of a material that has a lower coefficient of expansion than the material in the core barrel. As a result, there is relative movement between upper-end-fitting posts 30 and upper core plate 23. Experience has shown that, in typical fuel-assembly designs in which the flow plate is rigidly attached to the upper-end-fitting posts, variations occurring between the cold beginning of life of the fuel assembly and its hot end of life, when added to variations among fuel assemblies due to manufacturing tolerances, can total as much as 1¾ inch in a 170-inch-long fuel assembly. These variations result from a variety of factors, such as differential thermal expansion and radiation-induced growth and creep of the fuel assembly. The structure of the present invention, however, eliminates much of this variation because holddown column 38 is made of the same material, and therefore has the same temperature coefficient of expansion, as core barrel 24. In addition, the material typically used in core barrel 24 is stainless steel, which is less subject to radiation-induced variations than Zircaloy, the material typically used in the structural parts of the fuel assembly. Consequently, the total variation that can be expected in an assembly the size of the preferred embodiment is less than 0.4 inches. Since this variation is considerably smaller than that experienced in current designs, holddown springs can also be made smaller because the range of compressions to which the springs must exert the rated force is not as great.

Figure 3:
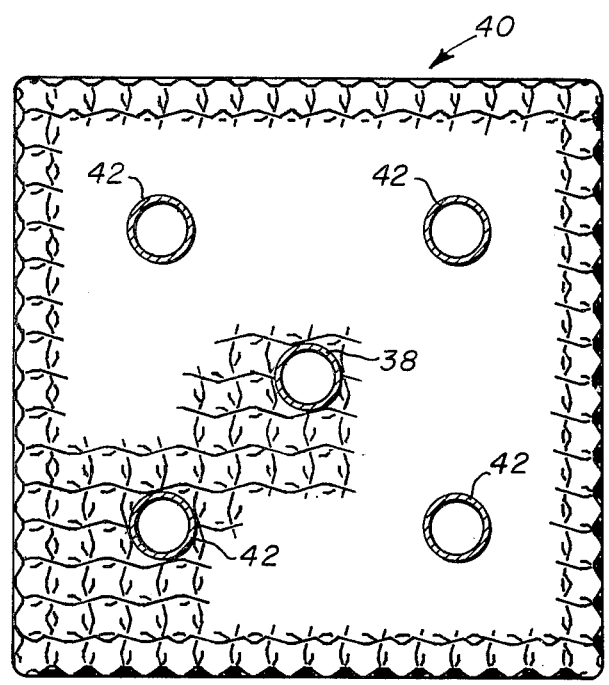
FIG. 3 is a cross-sectional view of the fuel assembly taken along Line 3—3 of FIG. 2.

FIG. 3 shows a typical cross section of a fuel assembly taken through a spacer grid 40 of FIG. 2. A typical holddown column 38 may have an inner diameter of 0.920 inches, an outer diameter of 0.980 inches, and a length of around 100 inches. Considering that the maximum holddown force to be expected is almost 1,800 lbs. in a typical reactor configuration, it may not appeal to the reader's intuition that a holddown column of this size has the ability to withstand such large forces. However, the spacer-grid structure shown in FIG. 3 is in a position to constitute a means for restricting lateral motion of the holddown column, so it affords lateral support to holddown column 38, and this lateral support greatly increases the load that the column can withstand without buckling. This is particularly true if a number of spacer grids 40 are distributed along the length of fuel assembly 26, as shown in FIG. 1. Tests have shown that stainless-steel tubes of the length shown in the preferred embodiment undergo lateral deflection at the center of the tube of less than 0.020 inches when assembled in fuel assemblies and subjected to axial loads in excess of 2,000 lbs.

Although only one embodiment of the present invention has been described in this application, many other embodiments will be apparent to those skilled in the art. Accordingly, the present invention is intended to embrace all such embodiments as fall within the scope of the appended claims.

What is claimed is:

1. In a nuclear reactor comprising at least one fuel assembly and a core barrel made of a material having a temperature coefficient of expansion, a means for preventing downstream motion of the fuel assembly, comprising:
   a. means for applying an upstream force;
   b. a lower end fitting constituting the upstream end of the fuel assembly and so arranged as to prevent relative downstream motion of the rest of the fuel assembly with respect to the lower end fitting; and
   c. a force-transmitting member, arranged to move freely in the upstream and downstream directions with respect to all of the fuel assembly except the lower end fitting and the means for applying an upstream force, whose upstream end engages the lower end fitting and whose downstream end engages the means for applying an upstream force, the force-transmitting member thereby transmitting to the means for applying an upstream force any downstream force applied to the lower end fitting and transmitting to the lower end fitting any upstream force applied to the force-transmitting member by the means for applying an upstream force, whereby the fuel assembly is held in place without applying a compressive load to the fuel assembly.

2. The apparatus of claim 1 in which the force-transmitting member is made of a material having the same temperature coefficient of expansion as the material out of which the core barrel is made.

3. The apparatus of claim 1 in which the force-transmitting member comprises at least one column arranged in such a manner that downstream force applied to the upstream end of the force-transmitting member is transmitted through each column to the downstream end of the force-transmitting member and the lower end fitting.

4. The apparatus of claim 2 in which the force-transmitting member comprises at least one column arranged in such a manner that downstream force applied to the upstream end of the force-transmitting member is transmitted through each column to the downstream end of the force-transmitting member and the lower end fitting.

5. An apparatus as recited in claim 2 wherein the means for applying an upstream force comprises:
   a. a stationary member;
   b. a seating surface disposed upstream of the stationary member and attached to the force-transmitting member; and
   c. compression means disposed between and engaging the stationary member and the seating surface.

6. An apparatus as recited in claim 5 wherein the compression means includes a holddown plate and a spring, the holddown plate being disposed between the spring and the stationary member.

7. An apparatus as recited in claim 2 further comprising means for restricting lateral motion of the force-transmitting member with respect to the fuel assembly.

8. An apparatus as recited in claim 7 wherein the restricting means comprises a spacer grid.